(12) United States Patent
Masunishi et al.

(10) Patent No.: US 12,352,775 B2
(45) Date of Patent: Jul. 8, 2025

(54) SENSOR AND MOVABLE BODY

(71) Applicant: KABUSHIKI KAISHA TOSHIBA, Tokyo (JP)

(72) Inventors: Kei Masunishi, Kawasaki Kanagawa (JP); Yasushi Tomizawa, Tokyo (JP); Etsuji Ogawa, Kawasaki Kanagawa (JP); Ryunosuke Gando, Yokohama Kanagawa (JP); Shiori Kaji, Kawasaki Kanagawa (JP); Hiroki Hiraga, Saitama Saitama (JP); Fumito Miyazaki, Yokohama Kanagawa (JP); Daiki Ono, Yokohama Kanagawa (JP); Kengo Uchida, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 346 days.

(21) Appl. No.: 17/823,054

(22) Filed: Aug. 29, 2022

(65) Prior Publication Data

US 2023/0288445 A1    Sep. 14, 2023

(30) Foreign Application Priority Data

Mar. 9, 2022    (JP) .................... 2022-035884

(51) Int. Cl.
*G01P 15/093*    (2006.01)
*G01P 15/08*    (2006.01)

(52) U.S. Cl.
CPC .... *G01P 15/093* (2013.01); *G01P 2015/0865* (2013.01)

(58) Field of Classification Search
CPC .......... G01P 15/093; G01P 2015/0865; G01P 15/0802; G01P 2015/0871; G01P 15/097; G01P 15/125; G01P 15/18
See application file for complete search history.

(56) References Cited

U.S. PATENT DOCUMENTS 11,333,679 B1 *    5/2022 Senkal ................. G01P 15/131
2017/0191830 A1 *    7/2017 Maeda ............... G01C 19/5776
(Continued)

FOREIGN PATENT DOCUMENTS

JP    H4-115165 A    4/1992
JP    2022-1828 A    1/2022
JP    2022-74658 A    5/2022

OTHER PUBLICATIONS

Dongsuk D. Shin et al., "Environmentally Robust Differential Resonant Accelerometer in a Wafer-Scale Encapsulation Process," MEMS 2017, pp. 17-20 (2017).

*Primary Examiner* — Xin Y Zhong
(74) *Attorney, Agent, or Firm* — Finnegan, Henderson, Farabow, Garrett & Dunner, LLP

(57) ABSTRACT

According to one embodiment, a sensor includes a stage, a driver, and a detector. The stage includes a first portion and a second portion. The driver is configured to rotate the stage. A rotation axis of the stage passes through the first portion and is along a first direction. A second direction from the first portion to the second portion crosses the first direction. The second portion is configured to rotate along a circumferential direction with the rotation axis as a center when the stage rotating. The detector is provided at the second portion. The detector includes a first detection element configured to detect a first acceleration including a component along the second direction, and a second detection element configured to detect a second acceleration including a component along the first direction.

24 Claims, 8 Drawing Sheets

(56) References Cited

U.S. PATENT DOCUMENTS

2021/0270666 A1\* 9/2021 Ohira .................... G01H 1/003
2021/0396780 A1 12/2021 Masunishi et al.
2022/0137085 A1 5/2022 Masunishi et al.

\* cited by examiner

SENSOR AND MOVABLE BODY

CROSS-REFERENCE TO RELATED APPLICATIONS

This application is based upon and claims the benefit of priority from Japanese Patent Application No. 2022-035884, filed on Mar. 9, 2022; the entire contents of which are incorporated herein by reference.

FIELD

Embodiments of the invention generally relate to a sensor and a movable body.

BACKGROUND

For example, there is a sensor using a MEMS structure. It is desired to improve the characteristics of the sensor.

DETAILED DESCRIPTION

Figure 1:
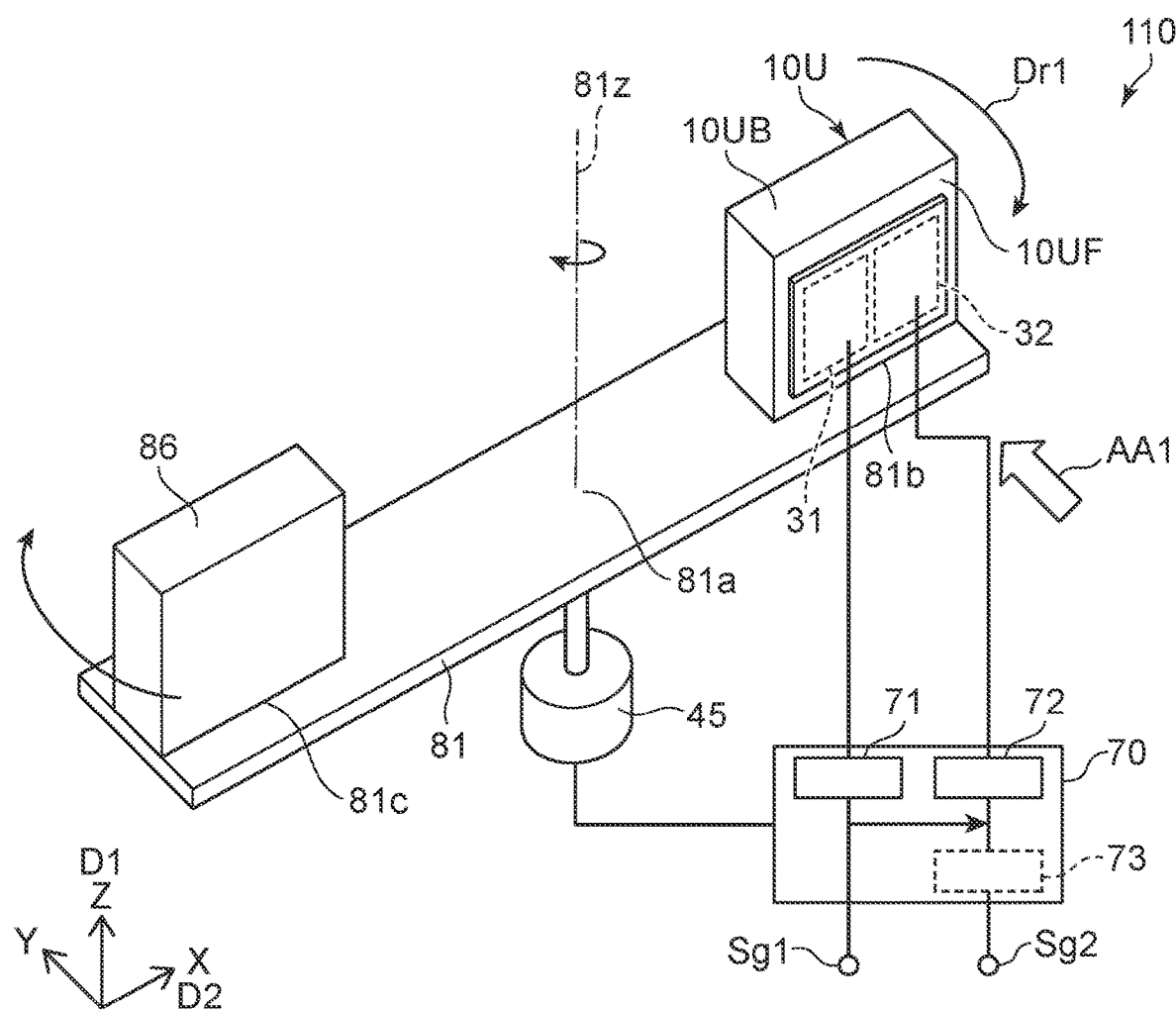
FIG. 1 is a schematic perspective view illustrating a sensor according to a first embodiment.

According to one embodiment, a sensor includes a stage, a driver, and a detector. The stage includes a first portion and a second portion. The driver is configured to rotate the stage. A rotation axis of the stage passes through the first portion and is along a first direction. A second direction from the first portion to the second portion crosses the first direction. The second portion is configured to rotate along a circumferential direction with the rotation axis as a center when the stage rotating. The detector is provided at the second portion. The detector includes a first detection element configured to detect a first acceleration including a component along the second direction, and a second detection element configured to detect a second acceleration including a component along the first direction.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with like reference numerals, and a detailed description is omitted as appropriate.

First Embodiment

FIG. 1 is a schematic perspective view illustrating a sensor according to a first embodiment.

As shown in FIG. 1, a sensor 110 according to the embodiment includes a stage 81, a driver 45, and a detector 10U.

The stage 81 includes a first portion 81a and a second portion 81b. The driver 45 is configured to rotate the stage 81. The rotation axis 81z of the stage 81 passes through the first portion 81a and is along a first direction D1. A second direction D2 from the first portion 81a to the second portion 81b crosses the first direction D1. When the stage 81 rotates, the second portion 81b rotates along a circumferential direction Dr1 with the rotation axis 81z as a center.

One direction perpendicular to a Z-axis direction is an X-axis direction. A direction perpendicular to the Z-axis direction and the X-axis direction is defined as a Y-axis direction. The second portion 81b rotates in the X-Y plane.

The detector 10U is provided at the second portion 81b. For example, the detector 10U is fixed to the second portion 81b. The detector 10U includes a first detection element 31 and a second detection element 32. The first detection element 31 is configured to detect a first acceleration including a component along the second direction D2. The second detection element 32 is configured to detect a second acceleration including a component along the first direction D1.

By rotating two detection elements that detect accelerations in two different directions (axes), for example, an orientation and a tilt angle can be detected.

The device that detects the azimuth and tilt angles can be applied as a North Finder. In a first reference example, a large mechanical gyro compass is used as the North Finder. The device of the first reference example is large and its application is limited.

In a second reference example, an azimuth measurement by a MEMS (Micro Electro Mechanical Systems) gyro sensor and a tilt angle measurement by a MEMS acceleration sensor are combined. In the second reference example, the control of the highly accurate MEMS gyro sensor is complicated. In the second reference example, in the MEMS gyro sensor and the MEMS acceleration sensor, an error due to axis misalignment may occur.

In the embodiment, the azimuth angle and the tilt angle can be detected by rotating two detection elements having a simple structure. In the embodiment, the error caused by the misalignment can be suppressed. Miniaturizing is easy. Controlling is easy. It is possible to provide a sensor whose characteristics can be improved. The sensor according to the embodiment can be applied to the North Finder.

As shown in FIG. 1, the sensor 110 may include a structure body 86. For example, the stage 81 may further include a third portion 81c. The first portion 81a is located between the third portion 81c and the second portion 81b in the second direction D2. The structure body 86 is fixed to the third portion 81c. By providing such a structure body 86, a balance of rotation is improved. For example, stable rotation can be obtained. For example, the load due to the moment of inertia on the driver 45 can be reduced.

For example, it is preferable that a first product of a first mass of the structure body 86 and a first distance between the structure body 86 and the rotation axis 81z is not less than ½ time and not more than 2 times a second product of a second mass of the detector 10U and a second distance between the detector 10U and the rotation axis 81z. More stable rotation can be obtained. In one example, the first distance is substantially the same as the second distance. For example, the first mass is substantially the same as the second mass.

As shown in FIG. 1, the sensor 110 may be provided with a controller 70. The controller 70 may be included in the sensor 110. At least a part of the controller 70 may be provided separately from the sensor 110.

The controller 70 includes, for example, a first processor 71 and a second processor 72. The first processor 71 is configured to output a first signal Sg1 based on a signal obtained from the first detection element 31. The first signal Sg1 includes, for example, information about the tilt angle. The first signal Sg1 includes, for example, at least one of information regarding the pitch angle with respect to the horizontal plane and information regarding the roll angle with respect to the horizontal plane. The horizontal plane is perpendicular to the direction of gravity.

The second processor 72 is configured to output a second signal Sg2 based on a signal obtained from the second detection element 32. The second signal Sg2 includes, for example, at least one of information about the azimuth of the earth and information about the latitude.

As shown in FIG. 1, the controller 70 may include a third processor 73. The third processor 73 corrects the second signal Sg2 before correction, based on at least a part of the first signal Sg1. For example, at least one of the orientation and latitude is corrected based on the detected tilt angle. More accurate orientation and latitude can be detected.

As shown in FIG. 1, for example, the detector 10U includes a base body 10UB. The base body 10UB includes a first surface 10UF. The first surface 10UF is along the first direction D1 and the second direction D2. The first surface 10UF crosses the circumferential direction Dr1. For example, the first surface 10UF may be substantially perpendicular to the circumferential direction Dr1. The first detection element 31 and the second detection element 32 are provided on the first surface 10UF.

As shown in FIG. 1, in this example, a position of the first portion 81a in the first direction D1 is between a position of the driver 45 in the first direction D1 and a position of the detector 10U in the first direction D1. For example, the first portion 81a is provided on the driver 45. The detector 10U is provided on the second portion 81b. The configuration becomes easy.

Hereinafter, examples of the first detection element 31 and the second detection element 32 will be described.

Figure 2:
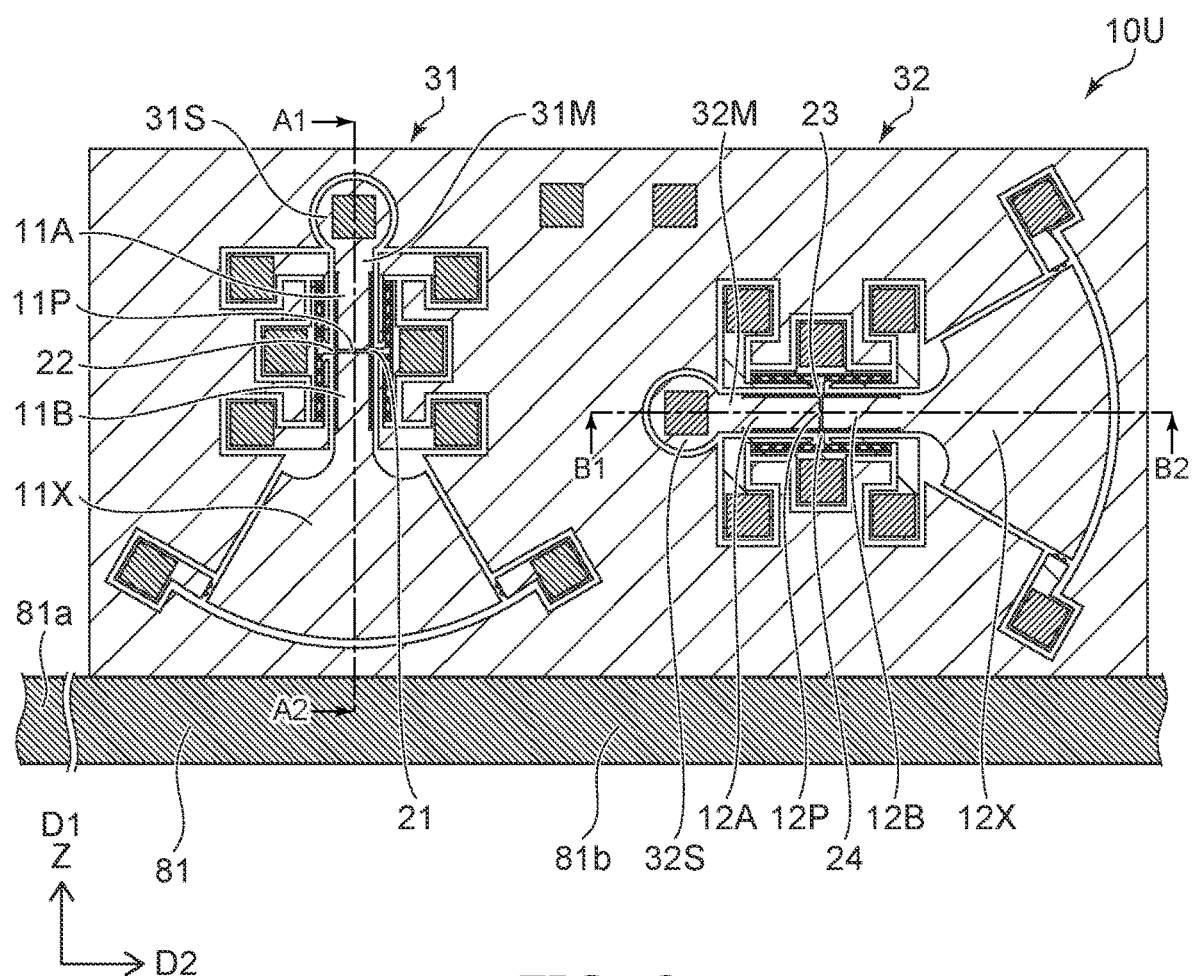
FIG. 2 is a schematic plan view illustrating a part of the sensor according to the first embodiment.

FIG. 2 is a schematic plan view illustrating a part of the sensor according to the first embodiment.

FIG. 2 illustrates a pattern when viewed from the arrow AA1 in FIG. 1.

Figure 3:
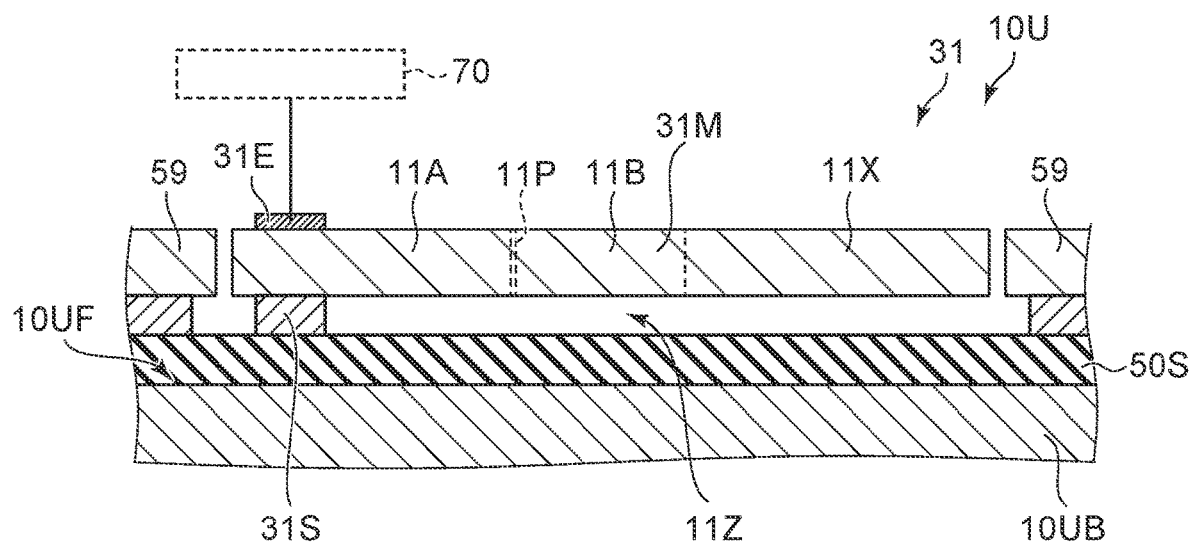
FIG. 3 is a schematic cross-sectional view illustrating a part of the sensor according to the first embodiment.
Figure 4:
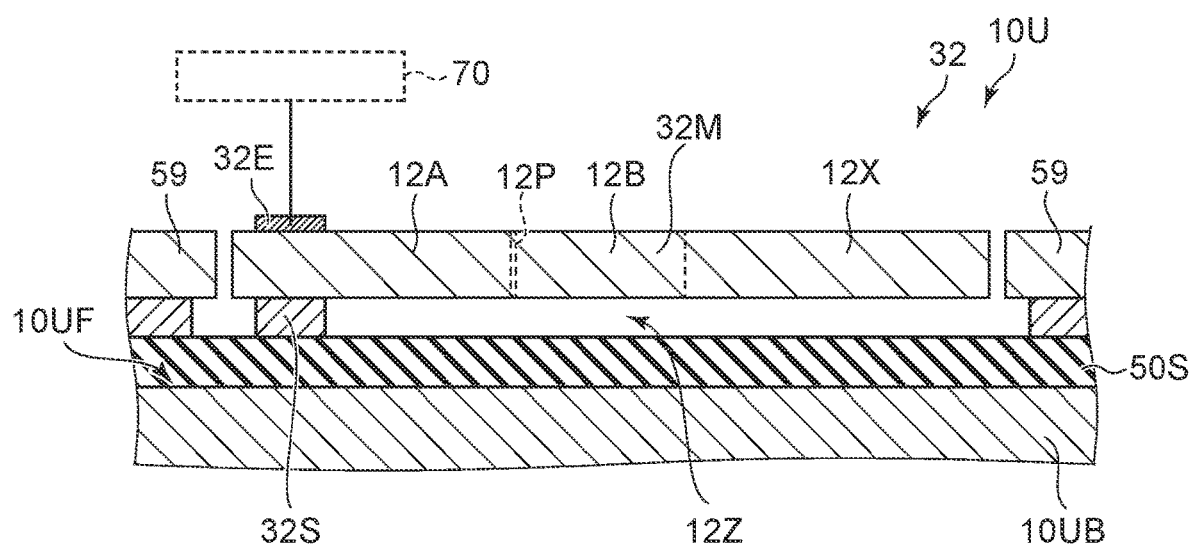
FIG. 4 is a schematic cross-sectional view illustrating a part of the sensor according to the first embodiment.

FIGS. 3 and 4 are schematic cross-sectional views illustrating a part of the sensor according to the first embodiment.

FIG. 3 is a sectional view taken along the line A1-A2 of FIG. 2. FIG. 4 is a sectional view taken along the line B1-B2 of FIG. 2.

As shown in FIG. 2, the first detection element 31 includes a first movable portion 31M. The first movable portion 31M is supported by a first support portion 31S. The first movable portion 31M includes a first beam 21 and a second beam 22. The first beam 21 and the second beam 22 extend along the first direction D1. A direction from the second beam 22 to the first beam 21 is along the second direction D2.

The second detection element 32 includes a second movable portion 32M. The second movable portion 32M is supported by a second support portion 32S. The second movable portion 32M includes a third beam 23 and a fourth beam 24. The third beam 23 and the fourth beam 24 extend along the second direction D2. A direction from the fourth beam 24 to the third beam 23 is along the first direction D1.

The controller 70 is configured to output, for example, a first value according to a first difference between the resonance frequency of the first beam 21 and the resonance frequency of the second beam 22. The first value corresponds to the first signal Sg1. The controller 70 is configured to output a second value according to a second difference between the resonance frequency of the third beam 23 and the resonance frequency of the fourth beam 24. The second value corresponds to the second signal Sg2.

As shown in FIGS. 3 and 4, for example, the detector 10U includes a substrate 50S. The substrate 50S is fixed to the first surface 10UF of the base body 10UB.

As shown in FIG. 3, the first support portion 31S is fixed to the substrate 50S. A first gap 11Z is provided between the substrate 50S and the first movable portion 31M.

As shown in FIG. 4, the second support portion 32S is fixed to the substrate 50S. A second gap 12Z is provided between the substrate 50S and the second movable portion 32M.

As shown in FIGS. 2 and 3, the first movable portion 31M includes a first movable base portion 11A, a first connection base portion 11P, and a first other movable base portion 11B. The first movable base portion 11A is supported by the first support portion 31S. The first connection base portion 11P is supported by the first movable base portion 11A. The first other movable base portion 11B is supported by the first connection base portion 11P. The first movable base portion 11A is located between the first support portion 31S and the first other movable base portion 11B in the first direction D1.

The second movable portion 32M includes a second movable base portion 12A, a second connection base portion 12P, and a second other movable base portion 12B. The second movable base portion 12A is supported by the second support portion 32S. The second connection base portion 12P is supported by the second movable base portion 12A. The second other movable base portion 12B is supported by the second connection base portion 12P. The second movable base portion 12A is located between the second support portion 32S and the second other movable base portion 12B in the second direction D2. The second connection base portion 12P is located between the second movable base portion 12A and the second other movable base portion 12B in the second direction.

As shown in FIG. 2, a width of the first connection base portion 11P along the second direction D2 is narrower than a width of the first movable base portion 11A along the second direction D2, and narrower than a width of the first other movable base portion 11B along the second direction D2. A width of the second connection base portion 12P along the first direction D1 is narrower than a width of the second movable base portion 12A along the first direction D1 and narrower than a width of the second other movable base portion 12B along the first direction D1.

For example, in the first detection element 31, when an acceleration along the second direction D2 is applied, the first other movable base portion 11B is displaced around the first connection base portion 11P. For example, in the second detection element 32, when an acceleration along the first direction D1 is applied, the second other movable base portion 12B is displaced around the second connection base portion 12P.

As shown in FIGS. 2 and 3, the first movable portion 31M may further include a first weight portion 11X. The first weight portion 11X is connected to the first other movable base portion 11B. In the first direction D1, the first other movable base portion 11B is located between the first movable base portion 11A and the first weight portion 11X. By providing the first weight portion 11X, it becomes easier to stably obtain a larger displacement.

As shown in FIGS. 2 and 4, the second movable portion 32M may further include a second weight portion 12X. The second weight portion 12X is connected to the second other movable base portion 12B. In the second direction D2, the second other movable base portion 12B is located between the second movable base portion 12A and the second weight portion 12X. By providing the second weight portion 12X, it becomes easier to stably obtain a larger displacement.

As shown in FIGS. 2, 3 and 4, the structural member 59 may be provided. The structural member 59 is provided around the first movable portion 31M and the second movable portion 32M in the X-Y plane. The structural member 59 may function, for example, as at least a part of the stopper.

As shown in FIG. 3, an electrode 31E may be provided. The electrode 31E is provided, for example, on the first support portion 31S. The electrode 31E is electrically connected to the first movable portion 31M. The controller 70 is electrically connected to the first movable portion 31M via the electrode 31E. The first movable portion 31M is conductive.

As shown in FIG. 4, an electrode 32E may be provided. The electrode 32E is provided, for example, on the second support portion 32S. The electrode 32E is electrically connected to the second movable portion 32M. The controller 70 is electrically connected to the second movable portion 32M via the electrode 32E. The second movable portion 32M is conductive.

Figure 5:
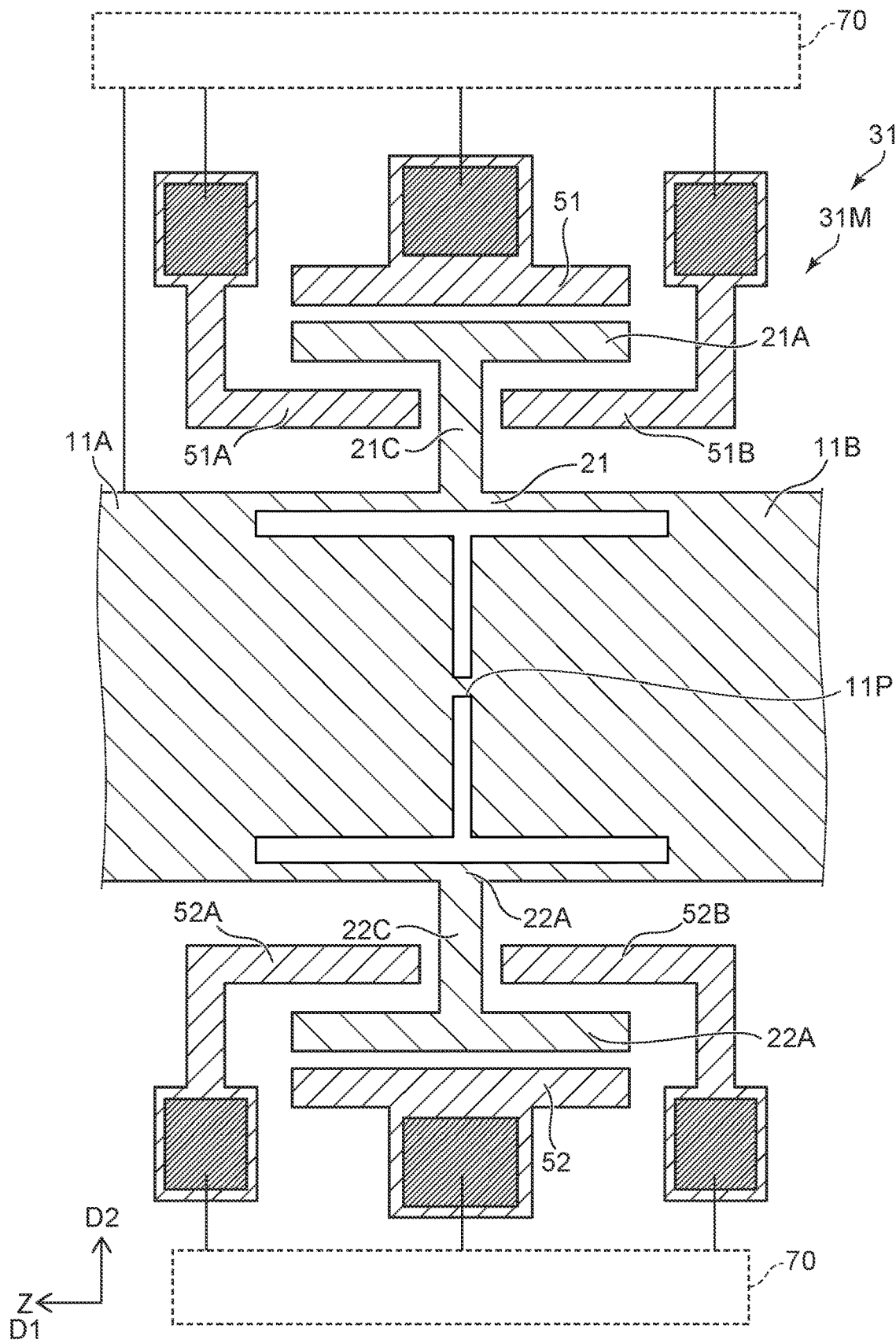
FIG. 5 is a schematic plan view illustrating a part of the sensor according to the first embodiment.
Figure 6:
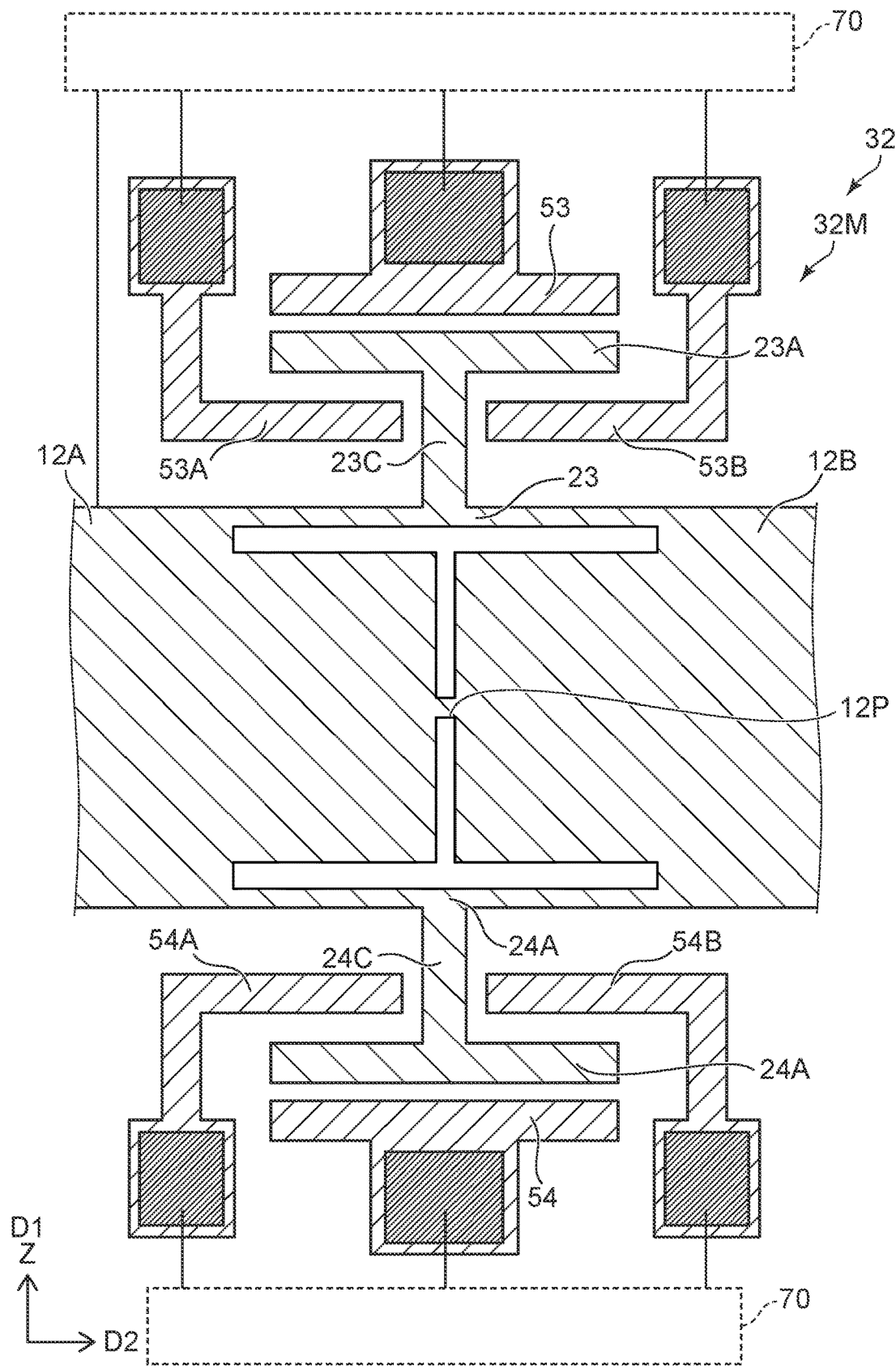
FIG. 6 is a schematic plan view illustrating a part of the sensor according to the first embodiment.

FIGS. 5 and 6 are schematic plan views illustrating a part of the sensor according to the first embodiment.

FIG. 5 is an enlarged example of the first detection element 31. FIG. 6 is an enlarged example of the second detection element 32.

As shown in FIG. 5, one end (first end) of the first beam 21 is connected to a part of the first movable base portion 11A. The other end portion (first other end portion) of the first beam 21 is connected to a part of the first other movable base portion 11B.

As shown in FIG. 5, one end (second end) of the second beam 22 is connected to another part of the first movable base portion 11A. The other end portion (second other end portion) of the second beam 22 is connected to another part of the first other movable base portion 11B. The first connection base portion 11P is located between the second beam 22 and the first beam 21 in the second direction D2.

As shown in FIG. 6, one end (third end) of the third beam 23 is connected to a part of the second movable base portion 12A. The other end portion (third other end portion) of the third beam 23 is connected to a part of the second other movable base portion 12B.

As shown in FIG. 6, one end (fourth end) of the fourth beam 24 is connected to another part of the second movable base portion 12A. The other end portion (fourth other end portion) of the fourth beam 24 is connected to another part of the second other movable base portion 12B. The second connection base portion 12P is located between the third beam 23 and the fourth beam 24 in the first direction D1.

For example, in the first detection element 31, the first other movable base portion 11B and the first weight portion 11X are displaced by the applied acceleration, and stress is applied to the first beam 21 and the second beam 22. For example, one of compressive stress and tensile stress is applied to the first beam 21. At this time, the other of the compressive stress and the tensile stress is applied to the second beam 22. This changes the resonant frequency of these two beams. By detecting the change in the resonance frequency, the applied stress can be detected.

For example, in the second detection element 32, the second other movable base portion 12B and the second weight portion 12X are displaced by the applied acceleration, and stress is applied to the third beam 23 and the fourth beam 24. For example, one of compressive stress and tensile stress is applied to the third beam 23. At this time, the other of the compressive stress and the tensile stress is applied to the fourth beam 24. This changes the resonant frequency of these two beams. By detecting the change in the resonance frequency, the applied stress can be detected.

As shown in FIG. 5, in this example, the first detection element 31 includes a first conductive portion 21A, a first fixed electrode 51, and a first element electrode 51A. The first conductive portion 21A is connected to the first beam 21. In this example, the first conductive portion 21A is connected to the first beam 21 by the first beam connecting portion 21C. The first conductive portion 21A extends along the first direction D1.

As shown in FIG. 5, the first fixed electrode 51 faces the first conductive portion 21A. The first fixed electrode 51 is fixed to the substrate 50S. The first element electrode 51A faces the first conductive portion 21A. The first element electrode 51A is fixed to the substrate 50S. In this example, the first other element electrode 51B is provided. The first other element electrode 51B faces the first conductive portion 21A. The first other element electrode 51B is fixed to the substrate 50S.

As shown in FIG. 5, in this example, the first detection element 31 includes a second conductive portion 22A, a second fixed electrode 52, and a second element electrode 52A. The second conductive portion 22A is connected to the second beam 22. In this example, the second conductive portion 22A is connected to the second beam 22 by the second beam connecting portion 22C. The second conductive portion 22A extends along the first direction D1.

As shown in FIG. 5, the second fixed electrode 52 faces the second conductive portion 22A. The second fixed electrode 52 is fixed to the substrate 50S. The second element electrode 52A faces the second conductive portion 22A. The second element electrode 52A is fixed to the substrate 50S. In this example, the second other element electrode 52B is provided. The second other element electrode 52B faces the second conductive portion 22A. The second other element electrode 52B is fixed to the substrate 50S.

As shown in FIG. 5, the controller 70 is electrically connected to the first fixed electrode 51, the first element electrode 51A, and the first other element electrode 51B. The controller 70 is electrically connected to the second fixed electrode 52, the second element electrode 52A, and the second other element electrode 52B. As described above, the controller 70 is electrically connected to the first movable portion 31M.

For example, the controller 70 applies a drive signal to the first fixed electrode 51 to vibrate the first beam 21. Signals corresponding to the vibration are generated in the first element electrode 51A and the first other element electrode 51B. The controller 70 detects the signals generated in the first element electrode 51A and the first other element electrode 51B. The controller 70 applies a drive signal to the second fixed electrode 52 to vibrate the second beam 22. Signals corresponding to the vibration are generated in the second element electrode 52A and the second other element electrode 52B. The controller 70 detects the signals generated in the second element electrode 52A and the second other element electrode 52B. The controller 70 is configured to detect a change in the difference in resonance frequency between the first beam 21 and the second beam 22.

A drive signal may be applied to the first element electrode 51A and the first other element electrode 51B, and signals corresponding to vibration may be detected via the first fixed electrode 51. A drive signal may be applied to the second element electrode 52A and the second other element electrode 52B, and signals corresponding to the vibration may be detected via the second fixed electrode 52.

As shown in FIG. 6, in this example, the second detection element 32 includes a third conductive portion 23A, a third fixed electrode 53, and a third element electrode 53A. The third conductive portion 23A is connected to the third beam 23. In this example, the third conductive portion 23A is connected to the third beam 23 by the third beam connecting portion 23C. The third conductive portion 23A extends along the second direction D2.

As shown in FIG. 6, the third fixed electrode 53 faces the third conductive portion 23A. The third fixed electrode 53 is fixed to the substrate 50S. The third element electrode 53A faces the third conductive portion 23A. The third element electrode 53A is fixed to the substrate 50S. In this example, the third other element electrode 53B is provided. The third other element electrode 53B faces the third conductive portion 23A. The third other element electrode 53B is fixed to the substrate 50S.

As shown in FIG. 6, in this example, the second detection element 32 includes a fourth conductive portion 24A, a fourth fixed electrode 54, and a fourth element electrode 54A. The fourth conductive portion 24A is connected to the fourth beam 24. In this example, the fourth conductive portion 24A is connected to the fourth beam 24 by the fourth beam connecting portion 24C. The fourth conductive portion 24A extends along the second direction D2.

As shown in FIG. 6, the fourth fixed electrode 54 faces the fourth conductive portion 24A. The fourth fixed electrode 54 is fixed to the substrate 50S. The fourth element electrode 54A faces the fourth conductive portion 24A. The fourth element electrode 54A is fixed to the substrate 50S. In this example, a fourth other element electrode 54B is provided. The fourth other element electrode 54B faces the fourth conductive portion 24A. The fourth other element electrode 54B is fixed to the substrate 50S.

As shown in FIG. 6, the controller 70 is electrically connected to the third fixed electrode 53, the third element electrode 53A, and the third other element electrode 53B. The controller 70 is electrically connected to the fourth fixed electrode 54, the fourth element electrode 54A, and the fourth other element electrode 54B. As described above, the controller 70 is electrically connected to the second movable portion 32M.

For example, the controller 70 applies a drive signal to the third fixed electrode 53 to vibrate the third beam 23. Signals corresponding to the vibration are generated in the third element electrode 53A and the third other element electrode 53B. The controller 70 detects the signals generated in the third element electrode 53A and the third other element electrode 53B. The controller 70 applies a drive signal to the fourth fixed electrode 54 to vibrate the fourth beam 24. Signals corresponding to the vibration are generated in the fourth element electrode 54A and the fourth other element electrode 54B. The controller 70 detects the signals generated in the fourth element electrode 54A and the fourth other element electrode 54B. The controller 70 is configured to detect a change in the difference in resonance frequency between the third beam 23 and the fourth beam 24.

A drive signal may be applied to the third element electrode 53A and the third other element electrode 53B, and signals corresponding to vibration may be detected via the third fixed electrode 53. A drive signal may be applied to the fourth element electrode 54A and the fourth other element electrode 54B, and signals corresponding to the vibration may be detected via the fourth fixed electrode 54.

As shown in FIG. 2, in this example, a positions of the second support portion 32S is between a position of the first portion 81a of the stage 81 in the second direction D2 and a position of the second other movable base portion 12B in the second direction D2. Acceleration can be applied to the second movable portion 32M more effectively. Higher sensitivity is obtained.

As shown in FIG. 2, in this example, there is a first other movable base portion 11B between the first support portion 31S and the second portion 81b. Acceleration can be applied to the first movable portion 31M more stably. More stable detection can be performed.

In the embodiment, the first detection element 31 and the second detection element 32 are provided on one base body 10UB. For example, members serving as these detection elements are formed on the base body 10UB and processed by lithography. By this processing, the first detection element 31 and the second detection element 32 are obtained. The first detection element 31 and the second detection element 32 are included in one MEMS sensor chip. The positional relationship between these elements can be controlled with high accuracy.

Hereinafter, an example of the characteristics of the detector 10U will be described.

In the embodiment, the driver 45 can rotate the stage 81 at a constant speed. The controller 70 acquires the output from the first detection element 31 and the output from the second detection element 32 obtained when the stage 81 is rotating at a constant speed. By processing these outputs, the first signal Sg1 and the second signal Sg2 are obtained.

Figure 7A:
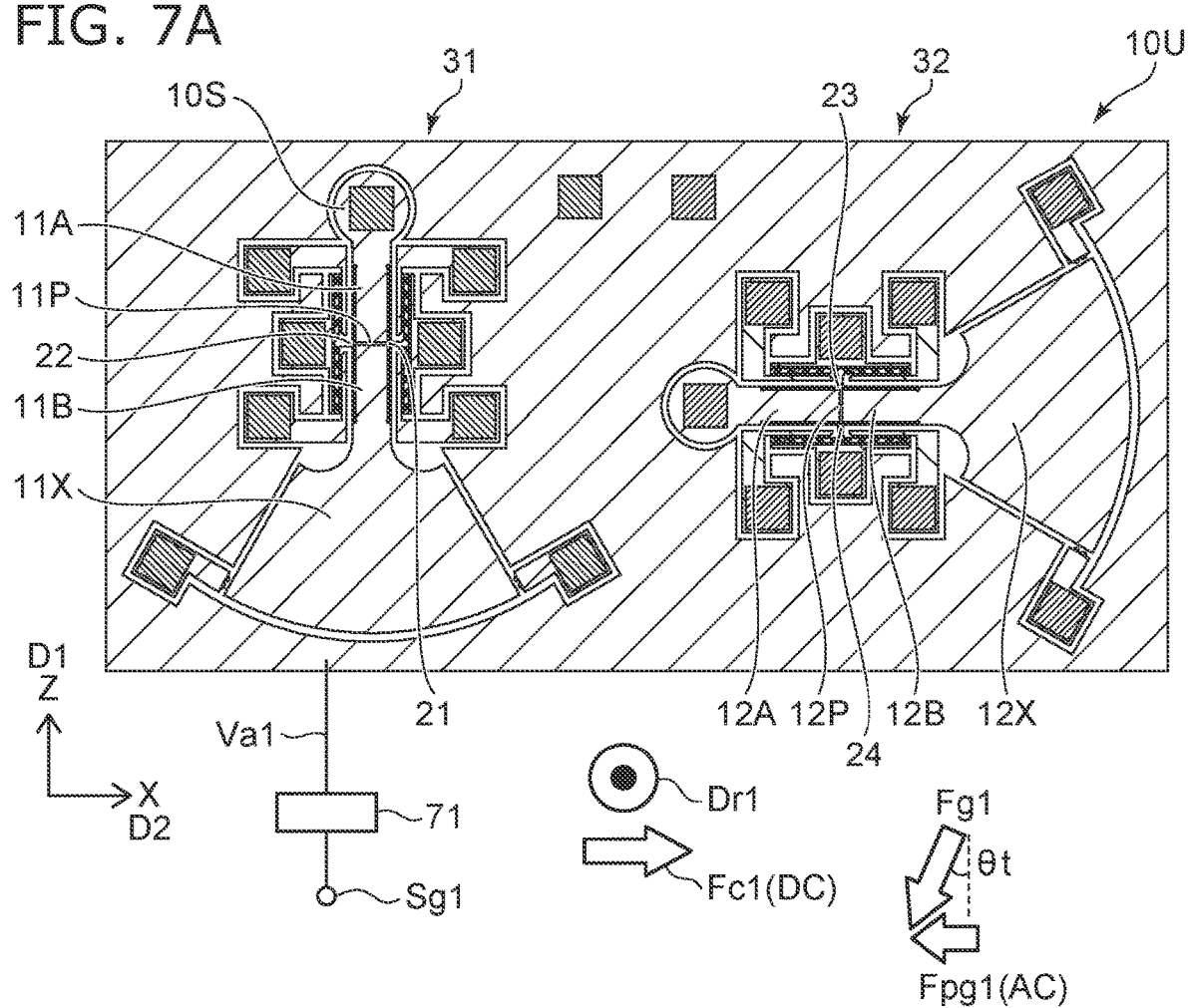
FIGS. 7A and 7B are schematic views illustrating the characteristics of the sensor according to the first embodiment.
Figure 7B:
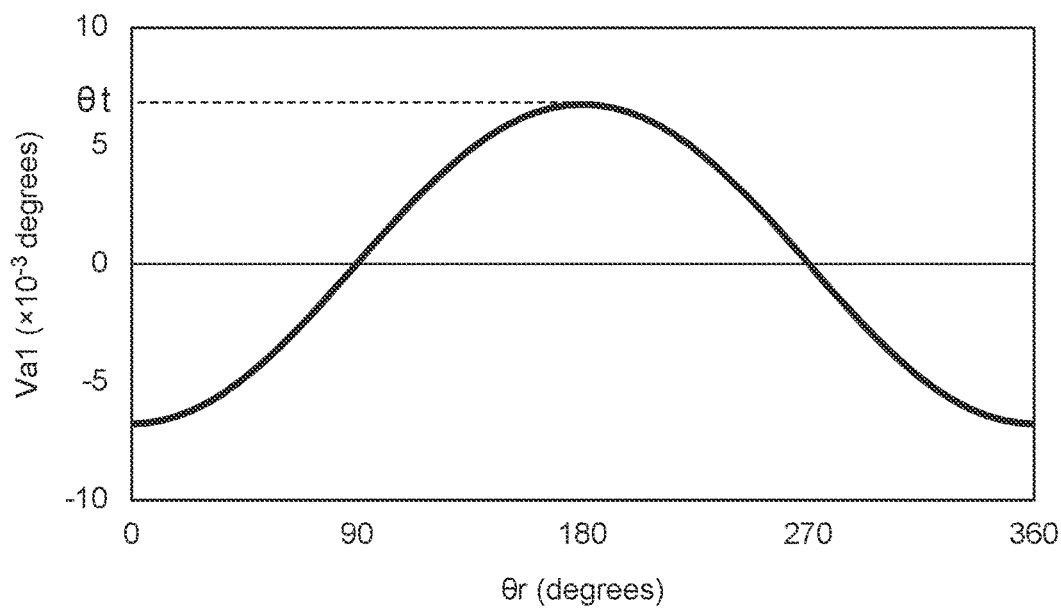

FIGS. 7A and 7B are schematic views illustrating the characteristics of the sensor according to the first embodiment.

As shown in FIG. 7A, the output (first value Va1) of the first detection element 31 is supplied to the first processor 71. The first value Va1 of the first detection element 31 includes information regarding the difference in resonance frequency between the first beam 21 and the second beam 22. The first processor 71 outputs the first signal Sg1 obtained by processing the first value Va1. The first signal Sg1 includes information regarding the tilt angle.

As shown in FIG. 7A, the first detection element 31 rotates along the circumferential direction Dr1. The circumferential direction Dr1 crosses (for example, orthogonally crosses) a plane including the first direction D1 and the second direction D2. A centrifugal force Fc1 acts on the first movable portion 31M of the first detection element 31. The centrifugal force Fc1 is substantially constant and is like a direct current (DC) force. When the rotation axis 81z of the stage 81 is tilted at the inclined angle θt from the direction of the gravity Fg1, the projection Fpg1 of the gravity Fg1 is added to the first movable portion 31M according to the inclined angle θt. The projection Fpg1 of gravity Fg1 has a component in the second direction D2. The projection Fpg1 of gravity Fg1 changes to alternating current (AC) in association with the rotation.

FIG. 7B is a graph illustrating the output (first value Va1) of the first detection element 31. The horizontal axis of FIG. 7B is the rotation angle θr. The vertical axis of FIG. 7B is the first value Va1 obtained from the first detection element 31. FIG. 7B illustrates the characteristics of the stage 81 in one rotation.

As shown in FIG. 7B, the projection Fpg1 of the gravity Fg1 with the inclined angle θt can be obtained according to the rotation angle θr. The projection Fpg1 of gravity Fg1 changes in a sinusoidal shape with respect to the rotation angle θr. For example, the maximum value of the first value Va1 or the absolute value of the minimum value of the first value Va1 corresponds to the inclined angle θt. In the embodiment, the tilt angle θt is obtained.

Figure 8A:
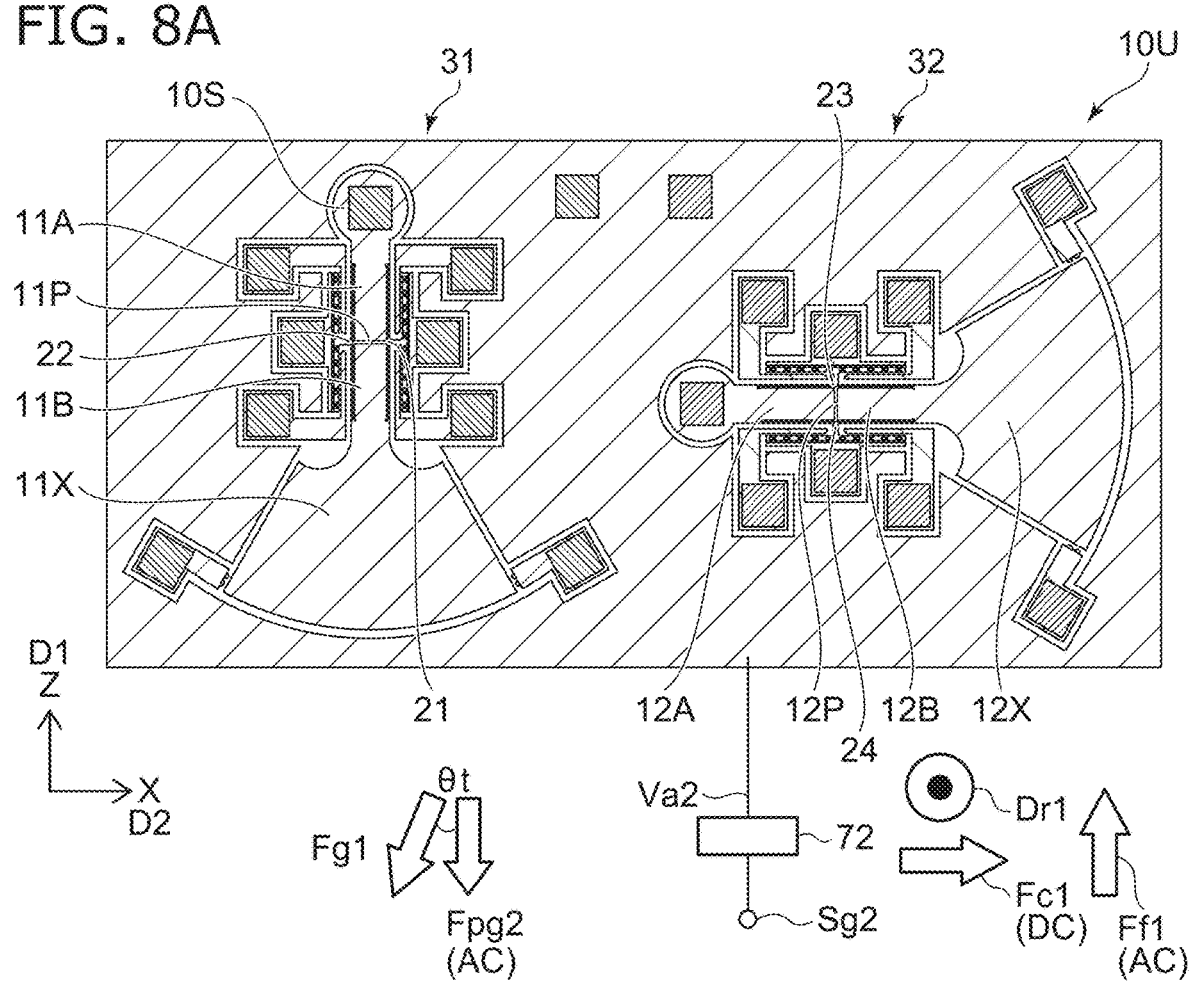
FIGS. 8A and 8B are schematic views illustrating the characteristics of the sensor according to the first embodiment.
Figure 8B:
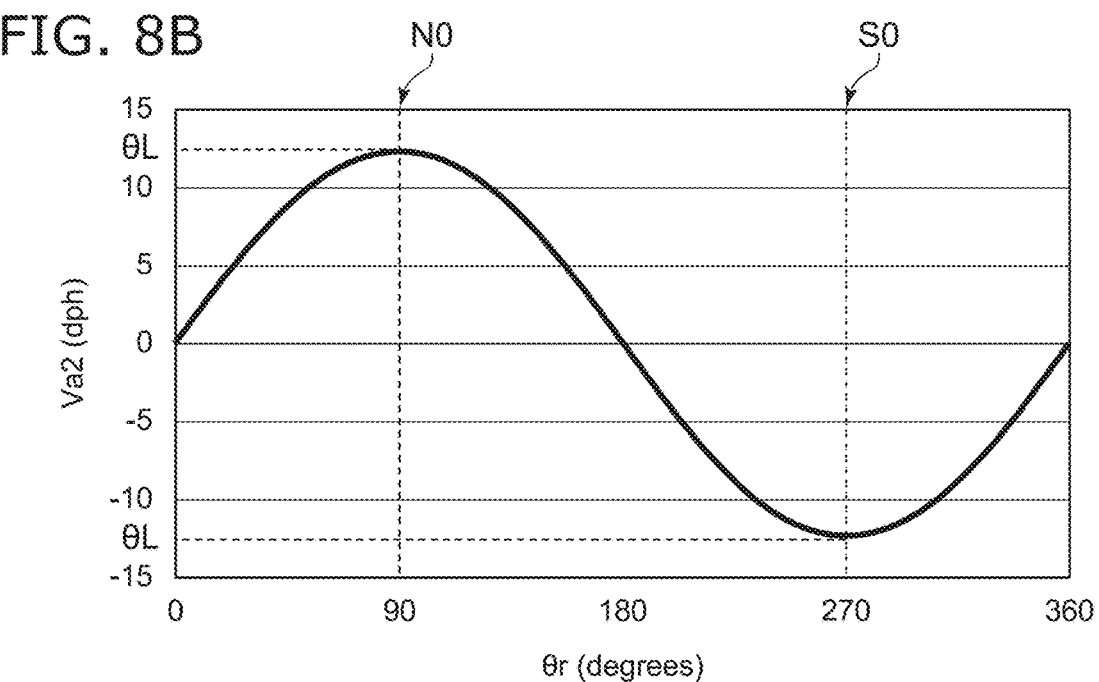

FIGS. 8A and 8B are schematic views illustrating the characteristics of the sensor according to the first embodiment.

As shown in FIG. 8A, the output (second value Va2) of the second detection element 32 is supplied to the second processor 72. The second value Va2 of the second detection element 32 includes information regarding the difference in resonance frequency between the third beam 23 and the fourth beam 24. The second processor 72 outputs the second signal Sg2 obtained by processing the second value Va2. The second signal Sg2 includes information regarding the azimuth and the latitude.

As shown in FIG. 8A, the second detection element 32 rotates along the circumferential direction Dr1. The circumferential direction Dr1 crosses (for example, orthogonally crosses) a plane including the first direction D1 and the second direction D2. A centrifugal force Fc1 acts on the second movable portion 32M of the second detection element 32. The centrifugal force Fc1 is substantially constant and is like a direct current (DC) force. When the rotation axis 81z of the stage 81 is tilted from the gravity Fg1 at an inclined angle θt, the projection Fpg2 of the gravity Fg1 is applied to the second movable portion 32M according to the inclination angle θt. The projection Fpg2 of gravity Fg1 has a component in the first direction D1. The projection Fpg2 of gravity Fg1 changes to alternating current (AC) in association with the rotation. Further, the Coriolis force Ff1 acts on the second movable portion 32M. The Coriolis force Ff1 changes to alternating current (AC) in association with the rotation. In the second movable portion 32M, the influence of the change of the projection Fpg2 of the gravity Fg1 is small and can be substantially ignored. The change in the AC component of the output obtained from the second detection element 32 mainly reflects the change due to the Coriolis force Ff1.

FIG. 8B is a graph illustrating the output (second value Va2) of the second detection element 32. The horizontal axis of FIG. 8B is the rotation angle θr. The vertical axis of FIG. 8B is the second value Va2 obtained from the second detection element 32. The unit of the second value Va2 is "dph" (degree per hour). FIG. 8B illustrates the characteristics of the stage 81 in one rotation.

As shown in FIG. 8B, in this example, when the rotation angle θr is 90 degrees, the second value Va2 becomes maximum. When the rotation angle θr is 270 degrees, the second value Va2 becomes the minimum. The maximum of the second value Va2 corresponds to, for example, the azimuth N0 in the north direction. The minimum of the second value Va2 corresponds to, for example, the azimuth S0 in the south direction.

The absolute value of the maximum value of the second value Va2 or the absolute value of the minimum value of the second value Va2 corresponds to the latitude θL. In embodiments, latitude θL is obtained.

In this way, the controller 70 can derive the first value Va1 based on the first difference (difference in resonance frequency between the first beam 21 and the second beam 22) when the stage 81 is rotating at a constant speed. The controller 70 can derive the second value Va2 based on the second difference (difference in resonance frequency between the third beam 23 and the fourth beam 24) when the stage 81 is rotating at a constant speed.

The first value Va1 corresponds to, for example, the inclined angle θt in the first direction D1 with respect to the gravity Fg1. For example, the controller 70 can output at least one of the roll angle and the pitch angle of the first direction D1 with respect to the gravity Fg1 based on the first difference.

The second value Va2 corresponds to, for example, the azimuth angle with respect to the axis of rotation of the earth. For example, the controller 70 can output at least one of the azimuth and latitude values based on the second difference described above.

As described above, the controller 70 may output a corrected value (second value Va2 after correction) of the second value Va2 before correction based on the first value Va1 described above. Higher accuracy can be obtained.

Second Embodiment

Figure 9:
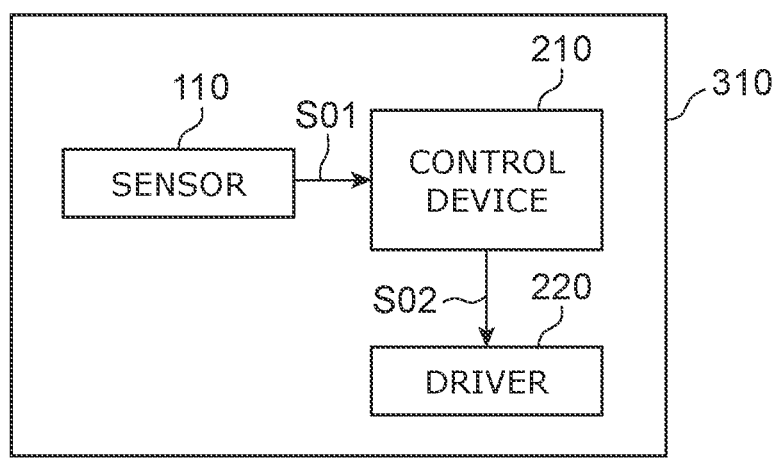
FIG. 9 is a schematic diagram illustrating a movable body according to a second embodiment.

FIG. 9 is a schematic diagram illustrating a movable body according to a second embodiment.

As shown in FIG. 9, the movable body 310 according to the embodiment includes the sensor 110 according to the first embodiment and the control device 210. The control device 210 controls the posture based on a signal S01 obtained from the sensor 110. For example, the control device 210 supplies a control signal S02 to the drive device 220. The posture of the movable body 310 is controlled by the operation of the drive device 220.

The embodiments may include the following configurations (for example, technical proposals).

(Configuration 1)

A sensor, comprising:
 a stage including a first portion and a second portion;
 a driver configured to rotate the stage, an rotation axis of the stage passing through the first portion and being along a first direction, a second direction from the first portion to the second portion crossing the first direction, the second portion being configured to rotate along a circumferential direction with the rotation axis as a center when the stage rotating; and
 a detector provided at the second portion,
 the detector including
  a first detection element configured to detect a first acceleration including a component along the second direction, and
  a second detection element configured to detect a second acceleration including a component along the first direction.

(Configuration 2)

The sensor according to Configuration 1, wherein
 the first detection element includes a first movable portion including a first beam and a second beam extending along the first direction, and a direction from the second beam to the first beam is along the second direction, and the second detection element includes a second movable portion including a third beam and a fourth beam extending along the second direction, and a direction from the fourth beam to the third beam is along the first direction.

(Configuration 3)

The sensor according to Configuration 2, wherein
the detector includes a base body including a first surface,
the first surface is along the first direction and the second direction, and
the first detection element and the second detection element are provided on the first surface.

(Configuration 4)

The sensor according to Configuration 2 or 3, further comprising a controller,
the controller being configured to output
a first value according to a first difference between a resonance frequency of the first beam and a resonance frequency of the second beam, and
a second value according to a second difference between a resonance frequency of the third beam and a resonance frequency of the fourth beam.

(Configuration 5)

The sensor according to Configuration 4, wherein
the controller is configured to derive the first value based on the first difference when the stage is rotating at a constant speed, and
the controller is configured to derive the second value based on the second difference when the stage is rotating at the constant speed.

(Configuration 6)

The sensor according to Configuration 4 or 5, wherein the first value corresponds to a tilt angle in the first direction with respect to a gravity.

(Configuration 7)

The sensor according to any one of Configurations 4 to 6, wherein the controller is configured to output at least one of a roll angle and a pitch angle in the first direction with respect to gravity based on the first difference.

(Configuration 8)

The sensor according to any one of Configurations 4 to 7, wherein the second value corresponds to an azimuth with respect to an axis of a rotation of earth.

(Configuration 9)

The sensor according to any one of Configurations 4 to 8, wherein the controller is configured to output at least one of azimuth and latitude values based on the second difference.

(Configuration 10)

The sensor according to any one of Configurations 4 to 9, wherein the controller is configured to output a corrected value of the second value before correction based on the first value.

(Configuration 11)

The sensor according to any one of Configurations 2 to 10, wherein
the detector includes a substrate,
the first detection element includes a first support portion fixed to the substrate, and the first movable portion is supported by the first support portion,
the second detection element includes a second support portion fixed to the substrate, and the second movable portion is supported by the second support portion,
a first gap is provided between the substrate and the first movable portion, and
a second gap is provided between the substrate and the second movable portion.

(Configuration 12)

The sensor according to Configuration 11, wherein
the first movable portion includes
a first movable base portion supported by the first support portion,
a first connection base portion supported by the first movable base portion, and
a first other movable base portion supported by the first connection base portion,
the first movable base portion is located between the first support portion and the first other movable base portion in the first direction,
the first connection base portion is located between the first movable base portion and the first other movable base portion in the first direction,
a first end of the first beam is connected to a part of the first movable base portion,
a first other end of the first beam is connected to a part of the first other movable base portion,
a second end of the second beam is connected to an other part of the first movable base portion,
a second other end of the second beam is connected to an other part of the first other movable base portion,
the first connection base portion is located between the second beam and the first beam in the second direction,
the second movable portion includes
a second movable base portion supported by the second support portion,
a second connection base portion supported by the second movable base portion, and
a second other movable base portion supported by the second connection base portion,
the second movable base portion is located between the second support portion and the second other movable base portion in the second direction,
the second connection base portion is located between the second movable base portion and the second other movable base portion in the second direction,
a third end of the third beam is connected to a part of the second movable base portion,
a third other end of the third beam is connected to a part of the second other movable base portion,
a fourth end of the fourth beam is connected to an other part of the second movable base portion,
a fourth other end of the fourth beam is connected to an other part of the second other movable base portion,
the second connection base portion is located between the third beam and the fourth beam in the first direction.

(Configuration 13)

The sensor according to Configuration 12, wherein
a first movable portion further includes a first weight portion,
the first weight portion is connected to the first other movable base portion,
the first other movable base portion is located between the first movable base portion and the first weight portion in the first direction,
the second movable portion further includes a second weight portion,
the second weight portion is connected to the second other movable base portion,
the second other movable base portion is located between the second movable base portion and the second weight portion in the second direction.

(Configuration 14)

The sensor according to Configuration 12 or 13, wherein the first detection element includes
- a first conductive portion connected to the first beam,
- a first fixed electrode facing the first conductive portion and being fixed to the substrate,
- a first element electrode facing the first conductive portion and being fixed to the substrate,
- a second conductive portion connected to the second beam,
- a second fixed electrode facing the second conductive portion and being fixed to the substrate, and
- a second element electrode facing the second conductive portion and being fixed to the substrate, the second detection element includes
- a third conductive portion connected to the third beam,
- a third fixed electrode facing the third conductive portion and being fixed to the substrate,
- a third element electrode facing the third conductive portion and being fixed to the substrate,
- a fourth conductive portion connected to the fourth beam,
- a fourth fixed electrode facing the fourth conductive portion and being fixed to the substrate, and
- a fourth element electrode facing the fourth conductive portion and being fixed to the substrate.

(Configuration 15)

The sensor according to any one of Configurations 12 to 14, wherein a position of the second support portion in the second direction is between a position of the first portion in the second direction and a position of the second other movable base portion in the second direction.

(Configuration 16)

The sensor according to any one of Configurations 12 to 15, wherein the first other movable base portion is located between the first support portion and the second portion.

(Configuration 17)

The sensor according to any one of Configurations 1 to 16, wherein a position of the first portion in the first direction is between a position of the driver in the first direction and a position of the detector in the first direction.

(Configuration 18)

The sensor according to any one of Configurations 1 to 17, further comprising a structure body,
the stage further including a third portion,
the first portion being between the third portion and the second portion in the second direction,
the structure body being fixed to the third portion,
a product of a mass of the structure body and a distance between the structure body and the rotation axis being not less than ½ times and not more than 2 times a product of a mass of the detector and a the distance between the detector and the rotation axis.

(Configuration 19)

A movable body, comprising:
a sensor according to any one of Configurations 1 to 18; and
a control device configured to control a posture based on a signal obtained from the sensor.

According to the embodiment, it is possible to provide a sensor and a movable body whose characteristics can be improved.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as stages, drivers, base bodies, substrates, support portions, movable portions, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors and movable bodies practicable by an appropriate design modification by one skilled in the art based on the sensors and the movable bodies described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
a stage including a first portion and a second portion;
a driver configured to rotate the stage, an rotation axis of the stage passing through the first portion and being along a first direction, a second direction from the first portion to the second portion crossing the first direction, the second portion being configured to rotate along a circumferential direction with the rotation axis as a center when the stage rotating, the rotation axis being kept to be perpendicular to the stage; and
a detector provided at the second portion,
the detector including
a first detection element configured to detect a first acceleration including a component along the second direction, and
a second detection element configured to detect a second acceleration including a component along the first direction.

2. The sensor according to claim 1, wherein
the first detection element includes a first movable portion including a first beam and a second beam extending along the first direction, and a direction from the second beam to the first beam is along the second direction, and
the second detection element includes a second movable portion including a third beam and a fourth beam extending along the second direction, and a direction from the fourth beam to the third beam is along the first direction.

3. The sensor according to claim 2, wherein
the detector includes a base body including a first surface,
the first surface is along the first direction and the second direction, and
the first detection element and the second detection element are provided on the first surface.

4. The sensor according to claim 2, further comprising a controller,
the controller being configured to output
a first value according to a first difference between a resonance frequency of the first beam and a resonance frequency of the second beam, and
a second value according to a second difference between a resonance frequency of the third beam and a resonance frequency of the fourth beam.

5. The sensor according to claim 4, wherein
the controller is configured to derive the first value based on the first difference when the stage is rotating at a constant speed, and
the controller is configured to derive the second value based on the second difference when the stage is rotating at the constant speed.

6. The sensor according to claim 4, wherein the first value corresponds to a tilt angle in the first direction with respect to a gravity.

7. The sensor according to claim 4, wherein the controller is configured to output at least one of a roll angle and a pitch angle in the first direction with respect to gravity based on the first difference.

8. The sensor according to claim 4, wherein the second value corresponds to an azimuth with respect to an axis of a rotation of earth.

9. The sensor according to claim 4, wherein the controller is configured to output at least one of azimuth and latitude values based on the second difference.

10. The sensor according to claim 4, wherein the controller is configured to output a value of the second value corrected based on the first value.

11. The sensor according to claim 2, wherein
the detector includes a substrate,
the first detection element includes a first support portion fixed to the substrate, and the first movable portion is supported by the first support portion,
the second detection element includes a second support portion fixed to the substrate, and the second movable portion is supported by the second support portion,
a first gap is provided between the substrate and the first movable portion, and
a second gap is provided between the substrate and the second movable portion.

12. The sensor according to claim 11, wherein
the first movable portion includes
a first movable base portion supported by the first support portion,
a first connection base portion supported by the first movable base portion, and
a first other movable base portion supported by the first connection base portion,
the first movable base portion is located between the first support portion and the first other movable base portion in the first direction,
the first connection base portion is located between the first movable base portion and the first other movable base portion in the first direction,
a first end of the first beam is connected to a part of the first movable base portion,
a first other end of the first beam is connected to a part of the first other movable base portion,
a second end of the second beam is connected to an other part of the first movable base portion,
a second other end of the second beam is connected to an other part of the first other movable base portion,
the first connection base portion is located between the second beam and the first beam in the second direction,
the second movable portion includes
a second movable base portion supported by the second support portion,
a second connection base portion supported by the second movable base portion, and
a second other movable base portion supported by the second connection base portion,
the second movable base portion is located between the second support portion and the second other movable base portion in the second direction,
the second connection base portion is located between the second movable base portion and the second other movable base portion in the second direction,
a third end of the third beam is connected to a part of the second movable base portion,
a third other end of the third beam is connected to a part of the second other movable base portion,
a fourth end of the fourth beam is connected to an other part of the second movable base portion,
a fourth other end of the fourth beam is connected to an other part of the second other movable base portion,
the second connection base portion is located between the third beam and the fourth beam in the first direction.

13. The sensor according to claim 12, wherein
a first movable portion further includes a first weight portion,
the first weight portion is connected to the first other movable base portion,
the first other movable base portion is located between the first movable base portion and the first weight portion in the first direction,
the second movable portion further includes a second weight portion,
the second weight portion is connected to the second other movable base portion,
the second other movable base portion is located between the second movable base portion and the second weight portion in the second direction.

14. The sensor according to claim 12, wherein
the first detection element includes
a first conductive portion connected to the first beam,
a first fixed electrode facing the first conductive portion and being fixed to the substrate,
a first element electrode facing the first conductive portion and being fixed to the substrate,
a second conductive portion connected to the second beam,
a second fixed electrode facing the second conductive portion and being fixed to the substrate, and
a second element electrode facing the second conductive portion and being fixed to the substrate,
the second detection element includes
a third conductive portion connected to the third beam,
a third fixed electrode facing the third conductive portion and being fixed to the substrate,
a third element electrode facing the third conductive portion and being fixed to the substrate,
a fourth conductive portion connected to the fourth beam,
a fourth fixed electrode facing the fourth conductive portion and being fixed to the substrate, and
a fourth element electrode facing the fourth conductive portion and being fixed to the substrate.

15. The sensor according to claim 12, wherein a position of the second support portion in the second direction is between a position of the first portion in the second direction and a position of the second other movable base portion in the second direction.

16. The sensor according to claim 12, wherein the first other movable base portion is located between the first support portion and the second portion.

17. The sensor according to claim 1, wherein a position of the first portion in the first direction is between a position of the driver in the first direction and a position of the detector in the first direction.

18. The sensor according to claim 1, further comprising a structure body,
the stage further including a third portion,
the first portion being between the third portion and the second portion in the second direction,
the structure body being fixed to the third portion,
a product of a mass of the structure body and a distance between the structure body and the rotation axis being not less than ½ times and not more than 2 times a product of a mass of the detector and a distance between the detector and the rotation axis.

19. A movable body, comprising:
a sensor according to claim 1; and
a control device configured to control a posture based on a signal obtained from the sensor.

20. A sensor, comprising:
a stage including a first portion and a second portion;
a driver configured to rotate the stage, an rotation axis of the stage passing through the first portion and being along a first direction, a second direction from the first portion to the second portion crossing the first direction, the second portion being configured to rotate along a circumferential direction with the rotation axis as a center when the stage rotating; and
a detector provided at the second portion,
the detector including
a first detection element configured to detect a first acceleration including a component along the second direction, and
a second detection element configured to detect a second acceleration including a component along the first direction,
wherein
the first detection element includes a first movable portion including a first beam and a second beam extending along the first direction, and a direction from the second beam to the first beam is along the second direction, and
the second detection element includes a second movable portion including a third beam and a fourth beam extending along the second direction, and a direction from the fourth beam to the third beam is along the first direction,
the detector includes a substrate,
the first detection element includes a first support portion fixed to the substrate, and the first movable portion is supported by the first support portion,
the second detection element includes a second support portion fixed to the substrate, and the second movable portion is supported by the second support portion,
a first gap is provided between the substrate and the first movable portion, and
a second gap is provided between the substrate and the second movable portion,
the first movable portion includes
a first movable base portion supported by the first support portion,
a first connection base portion supported by the first movable base portion, and
a first other movable base portion supported by the first connection base portion,
the first movable base portion is located between the first support portion and the first other movable base portion in the first direction,
the first connection base portion is located between the first movable base portion and the first other movable base portion in the first direction,
a first end of the first beam is connected to a part of the first movable base portion,
a first other end of the first beam is connected to a part of the first other movable base portion,
a second end of the second beam is connected to an other part of the first movable base portion,
a second other end of the second beam is connected to an other part of the first other movable base portion,
the first connection base portion is located between the second beam and the first beam in the second direction,
the second movable portion includes
a second movable base portion supported by the second support portion,
a second connection base portion supported by the second movable base portion, and
a second other movable base portion supported by the second connection base portion,
the second movable base portion is located between the second support portion and the second other movable base portion in the second direction,
the second connection base portion is located between the second movable base portion and the second other movable base portion in the second direction,
a third end of the third beam is connected to a part of the second movable base portion,
a third other end of the third beam is connected to a part of the second other movable base portion,
a fourth end of the fourth beam is connected to an other part of the second movable base portion,
a fourth other end of the fourth beam is connected to an other part of the second other movable base portion,
the second connection base portion is located between the third beam and the fourth beam in the first direction.

21. The sensor according to claim 20, wherein
a first movable portion further includes a first weight portion,
the first weight portion is connected to the first other movable base portion,
the first other movable base portion is located between the first movable base portion and the first weight portion in the first direction,
the second movable portion further includes a second weight portion,
the second weight portion is connected to the second other movable base portion,
the second other movable base portion is located between the second movable base portion and the second weight portion in the second direction.

22. The sensor according to claim 20, wherein
the first detection element includes
a first conductive portion connected to the first beam,
a first fixed electrode facing the first conductive portion and being fixed to the substrate,
a first element electrode facing the first conductive portion and being fixed to the substrate,
a second conductive portion connected to the second beam, a second fixed electrode facing the second conductive portion and being fixed to the substrate, and a second element electrode facing the second conductive portion and being fixed to the substrate, the second detection element includes a third conductive portion connected to the third beam, a third fixed electrode facing the third conductive portion and being fixed to the substrate, a third element electrode facing the third conductive portion and being fixed to the substrate, a fourth conductive portion connected to the fourth beam, a fourth fixed electrode facing the fourth conductive portion and being fixed to the substrate, and a fourth element electrode facing the fourth conductive portion and being fixed to the substrate.

23. The sensor according to claim 20, wherein a position of the second support portion in the second direction is between a position of the first portion in the second direction and a position of the second other movable base portion in the second direction.

24. The sensor according to claim 20, wherein the first other movable base portion is located between the first support portion and the second portion.

* * * * *